(12) United States Patent
Giron et al.

(10) Patent No.: US 11,457,328 B2
(45) Date of Patent: Sep. 27, 2022

(54) ELECTRONIC DEVICE, METHOD AND COMPUTER PROGRAM

(71) Applicant: Sony Corporation, Tokyo (JP)

(72) Inventors: Franck Giron, Stuttgart (DE); Fabien Cardinaux, Stuttgart (DE); Thomas Kemp, Stuttgart (DE); Stefan Uhlich, Stuttgart (DE); Marc Ferras Font, Stuttgart (DE); Andreas Schwager, Stuttgart (DE); Patrick Putzolu, Stuttgart (DE); Michael Enenkl, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 18 days.

(21) Appl. No.: 16/980,427

(22) PCT Filed: Mar. 13, 2019

(86) PCT No.: PCT/EP2019/056333
§ 371 (c)(1),
(2) Date: Sep. 14, 2020

(87) PCT Pub. No.: WO2019/175273
PCT Pub. Date: Sep. 19, 2019

(65) Prior Publication Data
US 2021/0006926 A1 Jan. 7, 2021

(30) Foreign Application Priority Data
Mar. 14, 2018 (EP) ..................... 18161780

(51) Int. Cl.
*H04S 7/00* (2006.01)
*H04R 1/40* (2006.01)
*H04R 3/12* (2006.01)

(52) U.S. Cl.
CPC ............. *H04S 7/303* (2013.01); *H04R 1/403* (2013.01); *H04R 3/12* (2013.01);
(Continued)

(58) Field of Classification Search
CPC .. H04S 7/303; H04S 2420/13; H04S 2400/11; H04R 1/403; H04R 3/12; H04R 2201/401; H04R 2430/20; H04R 2499/13
See application file for complete search history.

(56) References Cited

U.S. PATENT DOCUMENTS

| 8,170,246 B2 | 5/2012 | Yoo |
| 2003/0156019 A1 | 8/2003 | Lehmann |

(Continued)

FOREIGN PATENT DOCUMENTS

| EP | 2687407 A1 | 1/2014 |
| JP | 4557054 B2 | 10/2010 |

(Continued)

OTHER PUBLICATIONS

International Search Report and Written Opinion dated May 31, 2019 for PCT/EP2019/056333 filed on Mar. 13, 2019, 11 pages.

(Continued)

*Primary Examiner* — Jason R Kurr
(74) *Attorney, Agent, or Firm* — Xsensus LLP

(57) ABSTRACT

An electronic device for a vehicle comprising circuitry configured to obtain information about a planned maneuver of the vehicle; and circuitry configured to determine the position and/or orientation of a sound field based on the information about the planned maneuver of the vehicle.

15 Claims, 16 Drawing Sheets

(52) U.S. Cl.
CPC .... *H04R 2201/401* (2013.01); *H04R 2430/20* (2013.01); *H04R 2499/13* (2013.01); *H04S 2420/13* (2013.01)

(56) References Cited

U.S. PATENT DOCUMENTS

| | | |
|---|---|---|
| 2005/0128106 A1 | 6/2005 | Nakaishi et al. |
| 2005/0270146 A1 | 12/2005 | Enya et al. |
| 2006/0001532 A1 | 1/2006 | Nagata |
| 2008/0202323 A1 | 8/2008 | Isozaki et al. |
| 2008/0215239 A1 | 9/2008 | Lee |
| 2012/0163621 A1 | 6/2012 | Riggs et al. |
| 2013/0178962 A1 | 7/2013 | DiMaria et al. |
| 2015/0258930 A1 | 9/2015 | Nakayama |
| 2016/0016513 A1 | 1/2016 | Di Censo et al. |
| 2016/0037282 A1 | 2/2016 | Giron |
| 2016/0073214 A1* | 3/2016 | Shiozawa ............... H04S 7/302 381/302 |
| 2016/0185290 A1 | 6/2016 | Someda et al. |
| 2017/0013385 A1 | 1/2017 | Vautin et al. |
| 2017/0013386 A1 | 1/2017 | Vautin et al. |
| 2018/0186286 A1* | 7/2018 | Groh ...................... B60Q 9/008 |

FOREIGN PATENT DOCUMENTS

| | | |
|---|---|---|
| JP | 2015-226147 A | 12/2015 |
| KR | 10-0781260 B1 | 11/2007 |
| WO | 2016/109829 A1 | 7/2016 |

OTHER PUBLICATIONS

Beattie, D., et al., "What's Around the Corner? Enhancing Driver Awareness in Autonomous Vehicles via In-Vehicle Spatial Auditory Displays," NordiCHI'14, Helsinki, Finland, Oct. 26-30, 2014, 10 pages.

* cited by examiner

500

| [0.1, 2[ kN | 5 ° |
| --- | --- |
| [2, 5[ kN | 7.5 ° |
| [5, 10[ kN | 10 ° |

Fig. 5

| | | |
|---|---|---|
| [0.1, 2[ kN | 5 cm | 5 ° |
| [2, 5[ kN | 7.5 cm | 7.5 ° |
| [5, 10[ kN | 10 cm | 10 ° |

| [0, 50[ km/h | 5 m |
|---|---|
| [50, 100[ km/h | 2 m |
| [100, 250[ km/h | 1 m |

| Sunny | 5 m |
|---|---|
| Cloudy | 2 m |
| Rainy | 1 m |

Fig. 12

ELECTRONIC DEVICE, METHOD AND COMPUTER PROGRAM

CROSS-REFERENCE TO RELATED APPLICATIONS

The present application is based on PCT filing PCT/EP2019/056333, filed Mar. 13, 2019, which claims priority to EP 18161780.4, filed Mar. 14, 2018, the entire contents of each are incorporated herein by reference.

TECHNICAL FIELD

The present disclosure generally pertains to the field of vehicle audio, in particular to devices, methods and computer programs for vehicle audio.

TECHNICAL BACKGROUND

Vehicle audio such as AM/FM and Digital Radio, CD, Navigation is equipment installed in a car or other vehicle to provide in-car entertainment and information for the vehicle occupants.

Audio rendering systems that can create virtual sound sources at arbitrary positions have been introduced for car audio. The low acoustic power requirements and well defined listener locations are beneficial to the optimization of such in-car systems.

Although rendering systems exist that are optimized for in-car use, it is generally desirable to improve techniques for rendering audio.

SUMMARY

According to a first aspect, the disclosure provides an electronic device for a vehicle comprising circuitry configured to obtain information about a planned maneuver of the vehicle; and circuitry configured to determine the position and/or orientation of a sound field based on the information about the planned maneuver of the vehicle.

According to a further aspect, the disclosure provides a method to determine the position and/or orientation of a sound field based on information about a planned maneuver of a vehicle.

According to a further aspect, the disclosure provides a computer program to determine the position and/or orientation of a sound field based on information about a planned maneuver of a vehicle.

According to a further aspect, the disclosure provides an electronic device for a vehicle comprising circuitry configured to obtain information about outside environmental information and/or vehicle state information of the vehicle; and circuitry configured to determine the audio wideness of a sound field produced by virtual sound sources based on the outside environmental information and/or the vehicle state information of a vehicle.

According to a further aspect, the disclosure provides a method to determine an audio wideness of a sound field produced by virtual sound sources based on outside environmental information and/or vehicle state information of a vehicle.

According to a further aspect, the disclosure provides a computer program to determine an audio wideness of a sound field produced by virtual sound sources based on outside environmental information and/or vehicle state information of a vehicle.

According to a further aspect, an electronic device for a vehicle comprising circuitry configured to obtain information about an urgency of notification information and information about a position of a passenger inside the vehicle; and circuitry configured to determine the position and/or orientation of a sound field based on the urgency of the notification information and the information about the position of the passenger inside the vehicle.

According to a further aspect, the disclosure provides a method to determine the position and/or orientation of a sound field based on an urgency of notification information and information about a position of a passenger inside a vehicle.

According to a further aspect, the disclosure provides a computer program to determine the position and/or orientation of a sound field based on an urgency of notification information and information about a position of a passenger inside a vehicle.

Further aspects are set forth in the dependent claims, the following description and the drawings.

BRIEF DESCRIPTION OF THE DRAWINGS

Embodiments are explained by way of example with respect to the accompanying drawings, in which:

FIG. 5 schematically depicts a table where a relation between an inclination angle of a sound field and a braking force is predefined;

FIG. 7 schematically depicts table where a relation between a shifting distance, an inclination angle and a braking force is predefined;

FIG. 11 schematically depicts a table where a relation between a distance between virtual sound sources and a velocity of a vehicle is predefined;

FIG. 12 schematically depicts a table where a relation between a distance between virtual sound sources and outside environmental information of a vehicle is predefined;

DETAILED DESCRIPTION OF EMBODIMENTS

Figure 1:
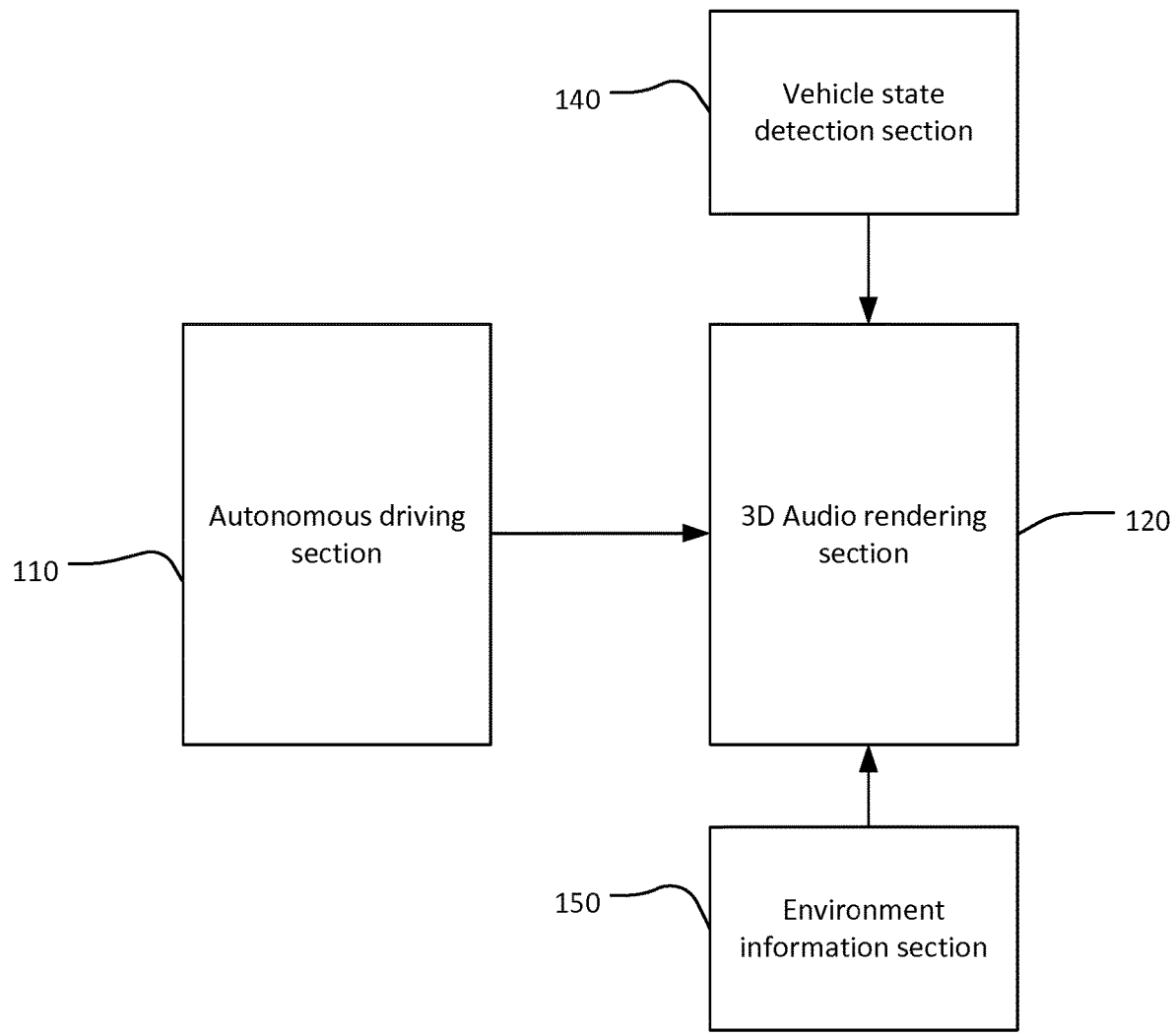
FIG. 1 schematically depicts a configuration of a 3D audio rendering section that is used in the context of autonomous driving.

The embodiments described below provide an electronic device for a vehicle comprising circuitry configured to obtain information about a planned maneuver of the vehicle; and circuitry configured to determine the position and/or orientation of a sound field based on the information about the planned maneuver of the vehicle.

The electronic device may for example anticipate planned break or acceleration maneuvers of an autonomous driving unit by moving a sound field within the vehicle, thus pre-informing and preparing the driver for the planned maneuver.

The planned maneuver may for example be planned by an autonomous or semi-autonomous driving unit of a car. The planned maneuver may for example be an intended braking, an intended acceleration or an intended deceleration maneuver, an intended curving maneuver, or an intended starting maneuver.

Information about a planned maneuver of a vehicle may be any parameters that describe the planned maneuver. For example, information about a planned breaking maneuver may be a braking force that is applied by the breaking system of a vehicle. Alternatively, information about a planned curving maneuver may be a parameter that reflects the position of the steering wheel and that determines the curving radius. The information about the planned maneuver of the vehicle may also comprise a steering angle, a velocity, an accelerating parameter, or the like.

The electronic device may for example be an electronic control unit (ECU) that is located in a vehicle. ECUs are typically used in vehicles e.g. as a Door Control Unit (DCU), an Engine Control Unit (ECU), an Electric Power Steering Control Unit (PSCU), a Human-Machine Interface (HMI), Powertrain Control Module (PCM), a Seat Control Unit, a Speed Control Unit (SCU), a Telematic Control Unit (TCU), a Transmission Control Unit (TCU), a Brake Control Module (BCM; ABS or ESC), a Battery Management System (BMS), and/or a 3D audio rendering system. The electronic device may be an ECU that is specifically used for the purpose of controlling a vehicle audio system. Alternatively, an ECU that performs any of the functions described here may be used simultaneously for the purpose of controlling the vehicle audio system and other functions of the vehicle.

Circuitry of the electronic device may include a processor, a memory (RAM, ROM or the like), a memory and/or storage, interfaces, etc. Circuitry may comprise or may be connected with input means (mouse, keyboard, camera, etc.), output means (display (e.g. liquid crystal, (organic) light emitting diode, etc.)), loudspeakers, etc., a (wireless) interface, etc., as it is generally known for electronic devices (computers, smartphones, etc.). Moreover, circuitry may comprise or may be connected with sensors for sensing still images or video image data (image sensor, camera sensor, video sensor, etc.), for sensing environmental parameters (e.g. radar, humidity, light, temperature), etc.

The vehicle may be configured to transport people or cargo. The vehicle may be a car, a truck, a bus, a railed vehicle (train, tram), a watercraft (ship, boat), an aircraft or a spacecraft, or a wagon. The vehicle may in particular be an autonomous car, a semi-autonomous car in which an autonomous driving sections plans and executes maneuvers based on vehicle state information and environmental information.

The circuitry may be communicatively coupled to a loudspeaker array for generating the sound field. The speaker array may be composed of loudspeakers distributed over the interior of the vehicle.

A virtual sound source may be a sound field which gives the impression that a sound source is located in a predefined space. For example, the use of virtual sound sources may allow the generation of a spatially limited audio signal. In particular, generating virtual sound sources may be considered as a form of generating virtual speakers throughout the three-dimensional space, including behind, above, or below the listener. The electronic device may for example be capable to playback sound at arbitrary virtual positions defined by the electronic device, e.g. 50 cm in front of the driver. Such an effect may be achieved e.g. with Wave Field Synthesis or other rendering techniques.

The sound field produced by the virtual sound sources may transport any audio content to the passengers inside the car. For example, the sound field may transport speech or music obtained from a radio receiver of CD player, or MP3 player, or a streaming audio receiver inside the car.

According to the embodiments, the circuitry is configured to determine the position and/or orientation of the sound field by moving one or more virtual sound sources based on information about the planned maneuver of a vehicle.

According to the embodiments, the circuitry is configured to anticipate a planned maneuver by moving the sound field, respectively the virtual sound sources that produce the sound field, in accordance with the planned maneuver. The circuitry may for example be configured to anticipate a planned maneuver in a sound field generated by 3D audio rendering by moving the sound field (respectively the virtual sound sources which produce the sound field) in accordance with the vehicle dynamics expected of the planned maneuver. In order to relocate, move or tilt the sound field, virtual sound sources may be repositioned, for example by vertically or horizontally moving the sound sources.

According to the embodiments, the circuitry is configured to anticipate the planned maneuver by tilting the sound field based on an inclination angle in accordance with the planned maneuver. For example, a sound field may be tilted in accordance with an expected vehicle tilt caused by a breaking maneuver.

The relationship between the inclination angle of the sound field and the information about the planned maneuver may be prestored in the electronic device, e.g. predefined as a table. Alternatively, the relationship between the inclination angle of the sound field and the information about the planned maneuver may be based on a characteristic curve with multiple dimensions. Still alternatively, the relationship between the inclination angle of the sound field and the information about the planned maneuver may be based on a processor component which was trained using machine learning methods.

According to the embodiments, the circuitry is configured to anticipate the planned maneuver by moving the sound field horizontally in accordance with the planned maneuver. The horizontal moving distance of the position may be based on various information about the planned maneuver, such as velocity of the vehicle, braking force, etc. The relationship between the shifting distance and the parameters may be prestored in the electronic device, e.g. predefined as a table.

Alternatively, the relationship between the shifting distance of the sound field and the information about the planned maneuver may be based on a characteristic curve with multiple dimensions. Still alternatively, the relationship between the shifting distance of the sound field and the information about the planned maneuver may be based on a processor component which was trained using machine learning methods.

According to embodiments, the circuitry is configured to obtain the information about the planned maneuver from an autonomous driving section. The autonomous driving section may use any techniques for planning and executing autonomous driving known in the art. For example, the autonomous driving section may plan maneuvers of the vehicle based on information obtained from a navigation system, which is able to generate a road map and based on techniques to detect the surroundings, such as radar, laser light, GPS, odometry and computer vision. In the case where the vehicle is a self-driving vehicle, an autonomous driving section may be based on Bayesian Simultaneous localization and mapping (SLAM) algorithms, which fuse data from multiple sensors and an off-line map into current location estimates and map updates.

According to embodiments, the circuitry is configured to render the sound field according to the determined positions of the virtual sound sources. For example, the circuitry may be configured to produce the virtual sound sources by 3D Audio rendering techniques. Spatial audio rendering techniques for the generation of spatial sound fields may create a virtual acoustic environment (also called 3D audio, or 3D virtual audio). Examples are the so called 5.1 or 7.1 systems, which are composed of 5 or 7 loudspeaker enclosures and one or two extra subwoofer, which are designed to reproduce the low frequency range of sound with a higher energy. In such systems mathematical algorithms are used to reproduce a sound field as exactly as possible A 3D audio rendering operation may for example be based on Wavefield synthesis. Wavefield synthesis techniques may be used to generate a sound field that gives the impression that an audio point source is located inside a predefined space. Such an impression can, for example, be achieved by using a Wavefield synthesis approach that drives a loudspeaker array such that the impression of a virtual sound source is generated.

According to the embodiments, the 3D audio rendering operation is based on monopole synthesis. Monopole synthesis techniques may be used to generate a sound field that gives the impression that an audio point source is located inside a predefined space. Such an impression can, for example, be achieved by using a monopole synthesis is approach that drives a loudspeaker array such that the impression of a virtual sound source is generated.

The embodiments also disclose a method to determine the position and/or orientation of a sound field based on information about a planned maneuver of a vehicle.

The embodiments also disclose computer program to determine the position and/or orientation of a sound field based on information about a planned maneuver of a vehicle.

The embodiments described below also provide an electronic device for a vehicle comprising circuitry configured to obtain information about outside environmental information and/or vehicle state information of the vehicle; and circuitry configured to determine the audio wideness of a sound field produced by virtual sound sources based on the outside environmental information and/or the vehicle state information of a vehicle.

Outside environmental information and/or vehicle state information may correlate with a visual scenery depth of a passenger inside the vehicle. For example, the visual scenery depth of a passenger inside a vehicle typically depends on the driving conditions. For example, during a night drive or during a high speed drive the visual scenery depth of a passenger inside the vehicle is typically smaller than during a day drive or a during a low speed drive.

The electronic device according to the embodiments may allow to match the audio wideness with parameters that reflect the visual scenery depth of the passengers, thus synchronizing the visual and auditory experience of the passengers in the vehicle.

According to the embodiments, the circuitry is configured to, in order to determine the audio wideness of the sound field, determine a distance between virtual sound sources.

The relation between the wideness of the audio field, respectively the distance between virtual sound sources and environmental information and/or vehicle state information may be prestored in the electronic device, e.g. predefined as a table. Alternatively, the wideness of the audio field may be based on a characteristic curve with multiple dimensions. Still alternatively the wideness of the audio field may be based on a processor component which was trained using machine learning methods The vehicle state information, on which the wideness of the sound field may depend, may comprise information reflecting a speed of the vehicle. The vehicle state information may in particular be a current speed of the vehicle.

According to embodiments, vehicle state information comprises information reflecting a braking force, a steering angle of a steering wheel, and/or an accelerating parameter. The vehicle state information may in particular be information reflecting a current braking force, a current steering angle of steering wheel, and/or a current accelerating parameter According to embodiments, the outside environmental information, on which the wideness of the sound field may depend, comprises information reflecting an outside light intensity. The outside environmental information may for example indicate a night drive, atmospheric conditions, weather conditions, outside light intensity, or the like. The information related to the outside environment may for example, include parameters which are obtained via a rain drop sensor detecting rain, a fog sensor detecting fog, a sunshine sensor detecting a degree of sunshine, and a snow sensor detecting snowfall.

The circuitry of the electronic device may be configured to communicate with a vehicle state detecting section in order to obtain the vehicle state information. The vehicle state detecting section may for example comprise speed sensors, acceleration sensor, or the like. The electronic device may for example communicate with the vehicle state detecting section via a communication interface such as a CAN bus or LIN bus. The circuitry may receive vehicle state information from other ECUs inside a vehicle.

The circuitry of the electronic device may be configured to communicate with an environment information section in order to obtain the outside environment information. The environment information section may for example comprise light sensors, rain drop sensor, outside cameras, or the like. The electronic device may for example communicate with the vehicle state detecting section via a communication interface such as a CAN bus or LIN bus. The circuitry may receive vehicle state information from other ECUs inside a vehicle.

According to the embodiments, the circuitry is configured to produce the sound field by 3D Audio rendering techniques. The 3D audio rendering operation may for example be based on Wavefield synthesis. The 3D audio rendering operation may be based on monopole synthesis.

The embodiments also disclose a method to determine an audio wideness of a sound field produced by virtual sound sources based on outside environmental information and/or vehicle state information of a vehicle.

The embodiments also disclose a computer program to determine an audio wideness of a sound field produced by virtual sound sources based on outside environmental information and/or vehicle state information of a vehicle.

The embodiments described below in more detail also provide an electronic device for a vehicle comprising circuitry configured to obtain information about an urgency of notification information and information about a position of a passenger inside the vehicle; and circuitry configured to determine the position and/or orientation of a sound field based on the urgency of the notification information and the information about the position of the passenger inside the vehicle.

The circuitry may for example create a warning or information sound coming from any specified direction and/or distance. The urgency of notification information may be expressed by a distance between the virtual sound source and the passenger.

According to the embodiments, the circuitry is configured to obtain the urgency of the notification information. The urgency of the notification information may for example be determined from meta information related to the notification, e.g. an importance tag of an incoming message or the like.

The urgency of a notification information may for example relate to a phone call and the urgency of the notification information may depend on the time period the phone call is unanswered.

For example, if there is an incoming call, which is intended for a driver, the call sound could start at the dashboard of the vehicle. Then after a time period the call sound may be located closer to the intended person (e.g. driver), thus the intended person knows, that he is addressed. If the intended person does not react to a further time period, the call sound may be located more closer or even directly on the intended person.

According to an embodiment, the circuitry is configured to determine the position and/or orientation of the sound field by moving one or more virtual sound sources based on an urgency of notification information and information about a position of a passenger inside a vehicle.

According to an embodiment, the urgency of a notification information is based on a distance between a point of interest to which the notification information relates and the vehicle. The point of interest may for example relate to a traffic situation, such as an outside accident, emergency, police, etc. The point of interest could also be a radar trap.

According to an embodiment, the circuitry is configured to identify, based on the notification information, the passenger for which the notification information is intended, and to obtain the position of the identified passenger. The indented recipient of a notification may for example be obtained from meta information related to the message such as an address field of an Email or other type of message.

According to an embodiment, the circuitry is configured to provide the sound field for the passenger based on the position of the passenger and/or based on the position and orientation of the head of the passenger. The sound field may for example be associated with the passenger based on the presence and/or location of the passenger. An algorithm and sensor means may be used to obtain the presence and location of the passenger and associate the sound field to the passenger. The sensor may be connected to passenger seats. The sensor may for example be a pressure sensor, a temperature sensor and/or a video camera. The sensor may be configured to obtain the presence of passengers on the passenger seats in the vehicle.

For example, the sound field may be located at the head position of a passenger. The head position of a passenger may be obtained through video cameras. Video cameras such as monitoring the driver not to drop into sleeping mode may be reused.

The circuitry may be configured to obtain a head position and/or orientation data of the second passenger from a video camera. A viewing direction of a passenger may be obtained from a video camera, and the head position and orientation of the second passenger may be calculated by a face recognition algorithm. Based on the obtained head position and orientation, a sound field for the second passenger can be positioned.

The circuitry may be configured to position the sound field for the second passenger in a predefined distance from the head of the second passenger. The predefined distance may be arbitrarily chosen and may for example be 10 cm or 1 m. The distance may also been chosen based on features of the head of the second passenger.

The circuitry may be configured to obtain the notification information from an environment information section.

According to the embodiments, the circuitry is configured to render the sound field according to the determined position of the virtual sound source. For example, the circuitry may be configured to produce the virtual sound source by 3D Audio rendering techniques. For example, the 3D audio rendering operation is based on Wavefield synthesis. The 3D audio rendering operation may for example be based on monopole synthesis.

In addition to relocating the sound field, the level of the audio signal, e.g. the loudness of chimes (signal sounds), may be raised in dependence of the audio system program (music) level to ensure the driver is taking notice.

Still further sources in the mirror of the vehicle may be detected and the messaging may be based on the analysis (e.g. safety threshold based).

The embodiments also disclose a method to determine the position and/or orientation of a sound field based on an urgency of notification information and information about a position of a passenger inside a vehicle.

The embodiments also disclose a computer program to determine the position and/or orientation of a sound field based on an urgency of notification information and information about a position of a passenger inside a vehicle.

3D Audio Rendering

FIG. 1 is a block diagram depicting an example of schematic configuration of a 3D Audio rendering section that is used in the context of autonomous driving.

The 3D Audio rendering section 120 is communicatively coupled to an autonomous driving section 110, to a vehicle state detecting section 140, and to an environmental information section 150.

The 3D Audio rendering section 120 executes software for 3D audio rendering. In particular, the 3D Audio rendering section 120 renders a sound field within the car by placing virtual sound sources based on information about a planned maneuver provided from the autonomous driving section 110, and/or based on vehicle state information obtained from the vehicle state detecting section 140 (see e.g. 7110 of FIG. 17), and/or based on environmental information obtained from the environmental information section 150 (see e.g. 7400, 7500) or from an external environment (7750 of FIG. 17) of the vehicle.

The autonomous driving section 110 may implement an autonomous driving technique, which causes the vehicle to travel autonomously or semi-autonomously without depending on the operation of a driver. The autonomous driving section 110 may use various in-vehicle technologies and sensors, including adaptive cruise control, active steering, anti-lock braking systems which may be part of a driving system control unit (see 7100 of FIG. 17), GPS navigation technology (see 7640 of FIG. 17), lasers and radar (see 7400 of FIG. 17).

The 3D Audio rendering section 120 may virtually place virtual sound sources (see e.g. V1, V2, V3, V4 in FIG. 2) anywhere inside the vehicle, including behind, above or below of a passenger based on a maneuver planned by the autonomous driving section 110, based on vehicle state information and/or environmental information.

The information about a planned maneuver provided from the autonomous driving section 110 may for example relate to the fact that the vehicle, respectively the autonomous driving section 110 of the vehicle, intends to brake.

The vehicle state information may for example comprise the current speed of the vehicle, braking force, steering angle of a steering wheel, etc. In order to obtain vehicle state information various sensor may be used, for example a gyro sensor that detects the angular velocity of axial rotational movement of a vehicle body, an acceleration sensor that detects the acceleration of the vehicle, a steering angle sensor of a steering wheel, and/or a sensor that measures engine speed, etc.

The environmental information may include vehicle outside environment information, such as intensity of daily light, weather condition, etc., and/or vehicle inside condition such as, a position of a driver, fatigue degree of a driver, etc.

One or more microcomputers not shown in FIG. 1 (see e.g. 7610 of FIG. 17 and corresponding description below) of the electronic device 100 executes the algorithms of the 3D audio rendering section 120 and of the autonomous driving section 110. The 3D Audio rendering section 120 may thus be part of a vehicle control system, in particular an integrated control unit (see 7600 of FIG. 17). A more detailed description of a vehicle control system is provided below with regard to FIG. 17 below.

Vehicle with Virtual Sound Sources

Figure 2:
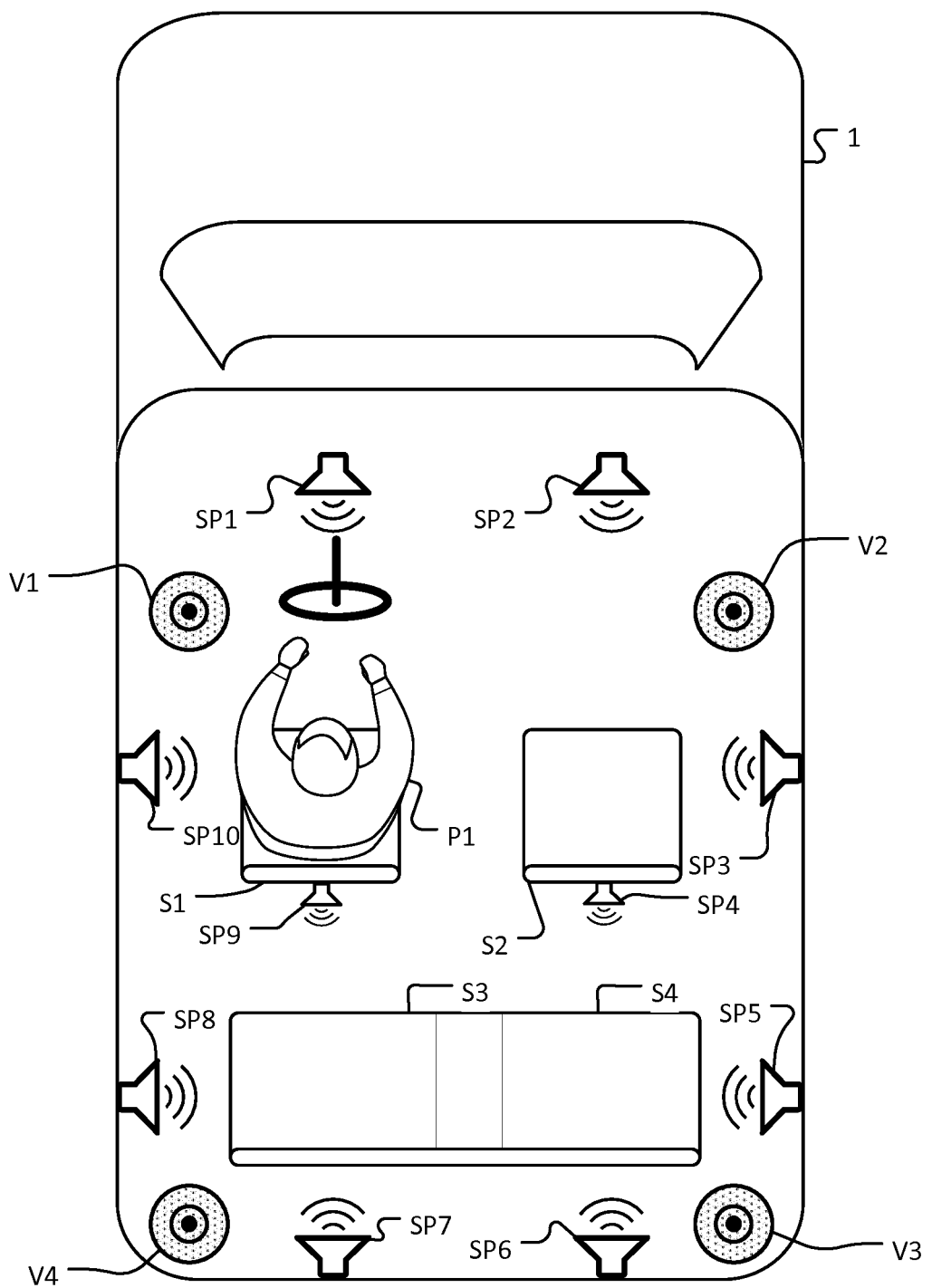
FIG. 2 schematically depicts a vehicle that comprises virtual sound sources generated by 3D audio rendering.

FIG. 2 schematically depicts, as an example, a vehicle that comprises virtual sound sources generated by 3D audio rendering.

The vehicle 1 is equipped with four seats S1 to S4 and ten loudspeakers SP1 to SP10. The front seats S1, S2 are provided for a driver P1 and, respectively, a co-driver and the rear seats S3, S4 are provided for passengers at the rear of the vehicle 1. In vehicle 1, a driver P1 is sitting on seat S1.

The loudspeakers SP1, SP2 are located at the instrument panel, the loudspeakers SP3, SP5, SP8 and SP10 are located at the doors, the loudspeakers SP6, SP7 are located at the rear parcel shelf and the loudspeakers SP4, SP10 are located at the seat back board of the front seats S1, S2. By means of 3D audio rendering, the speakers SP1 to SP10 are driven to generate virtual sound sources V1 to V4. The virtual sound sources V1 to V4 are placed inside the vehicle based on information about a planned maneuver (see embodiment of FIGS. 3 to 7, based on vehicle state information, and/or based on environmental information (see embodiment of FIGS. 8 to 12), or based on the urgency of notification information (see embodiment of FIGS. 13 and 13*a, b, c*).

The virtual sound sources V1 to V4 may be monopole sound sources which radiate sound equally in all directions. The simplest example of a monopole source would be a sphere whose radius alternately expands and contracts sinusoidally. It is also possible by using multiple monopole sound sources or algorithms such as Wavefield synthesis to create a directivity pattern for virtual sound sources.

Placing Virtual Sound Sources According to a Planned Maneuver

Figure 3:
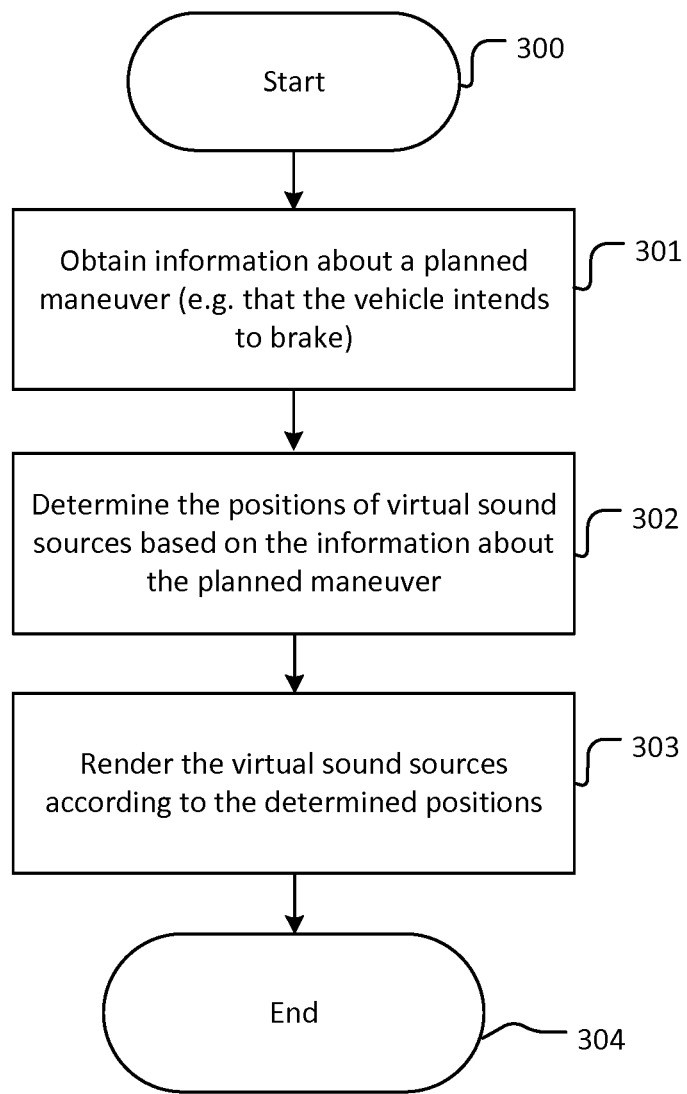
FIG. 3 schematically depicts a process that places virtual sound sources based on information about a planned maneuver.

FIG. 3 schematically depicts as an example, a process that places virtual sound sources (V1 to V4 in FIG. 2) based on information about a planned maneuver (e.g. a braking maneuver of a vehicle).

At 300, the process starts. At 301, the electronic device obtains information about a planned maneuver (e.g. that the vehicle intends to brake in some seconds). The information is for example obtained from an autonomous driving section (see 110 of FIG. 1) of the vehicle. At 302, the process determines the positions of one or more virtual sound sources based on the information about the planned maneuver. For example, as described in more detail with regard to FIGS. 4*a, b, c* below, an inclination angle θ of the sound field and/or shifting distance is determined based on the planned maneuver. At 303, the process renders the virtual sound sources according to the positions as determined in 302. At 304, the process ends.

Figure 4A:
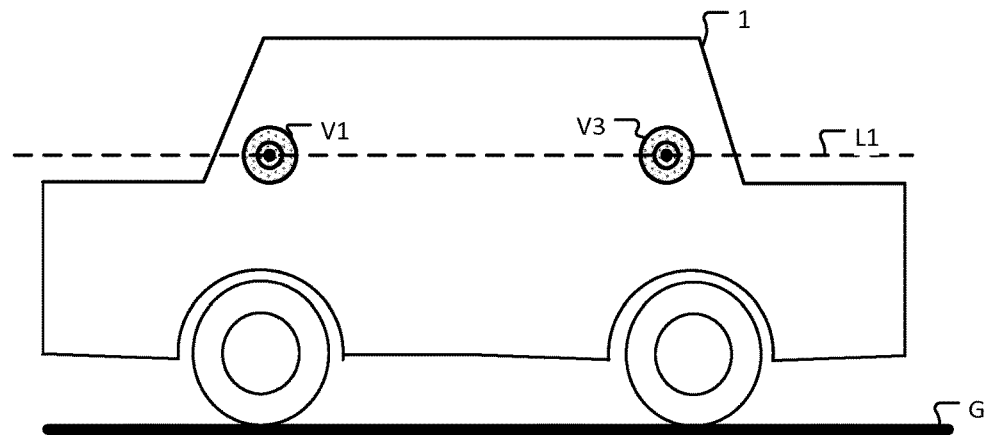
FIGS. 4a, b, c schematically depict a process of determining the positions of virtual sound sources based on the information about a planned maneuver.

FIGS. 4*a, b, c* schematically depict an example of a process of determining the positions of virtual sound sources based on the information about a planned maneuver. According to this embodiment, a 3D audio rendering section (see 120 of FIG. 1) obtains from an autonomous driving section (see 110 of FIG. 1) information that indicates that the vehicle intends to brake.

FIG. 4*a* shows the vehicle 1 in a normal driving state where the vehicle is driving on a road with substantially constant velocity. Virtual sound sources V1 and V3 are arranged inside the vehicle 1. In the normal driving state, the virtual sound sources V1 and V3 are arranged at equal height inside the vehicle 1, which is indicated in FIG. 4*a* by a first alignment line L1 that is parallel to the ground G (horizontal). The virtual sound source V1 and V3 reproduce sound (e.g. music from a CD or a radio broadcast program) for listening by the passengers inside the vehicle.

Figure 4B:
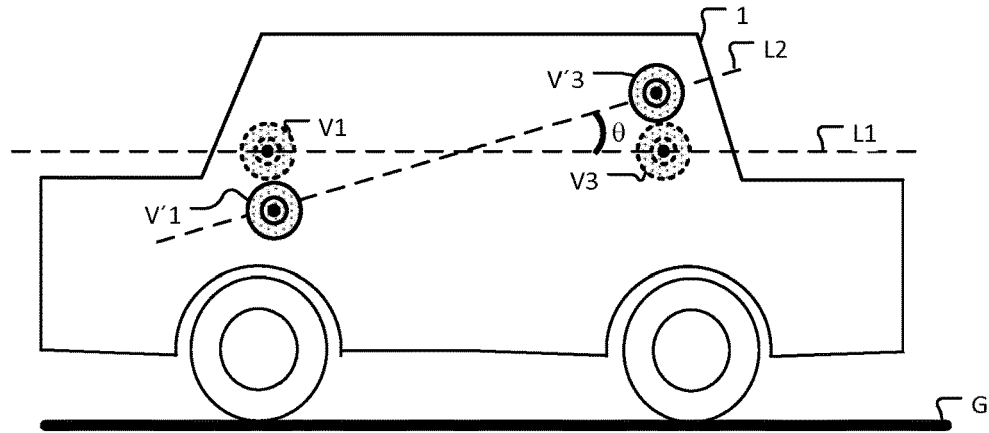
Figure 4C:
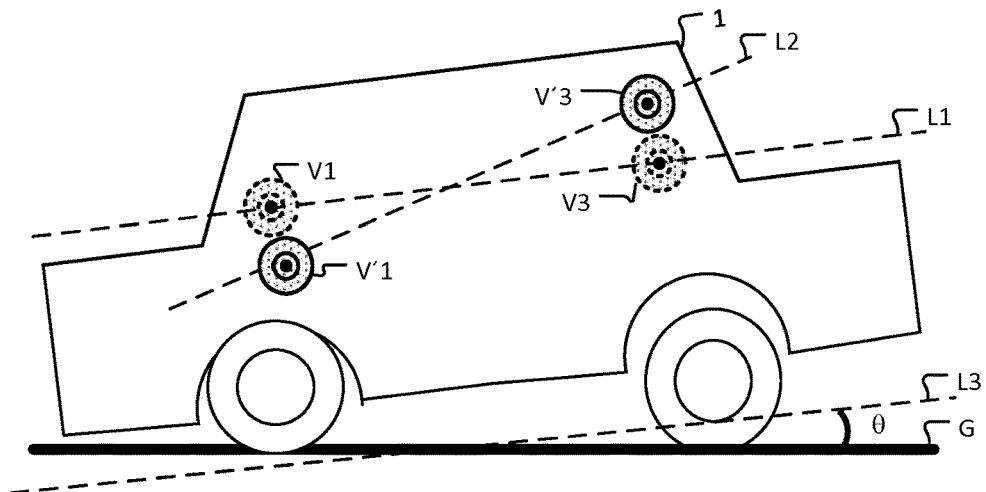

FIG. 4*b* shows the situation where the 3D audio rendering obtains the information about a planned maneuver, here that the vehicle intends to brake in some seconds. Based on the information about the planned maneuver (e.g. based on a braking force that an autonomous driving section intends to apply with the brakes), an inclination angle θ is determined which determines a tilting of the virtual sound sources V1 and V3. The inclination angle θ is an angle at which the first alignment line L1 is tilted to a second alignment line L2. The centers of the virtual sound sources are rearranged on the second alignment line L2, while keeping the distance between the virtual sound sources constant. The 3D audio rendering shifts the virtual sound sources V1 and V3 to respective locations that are indicated as V1' and V'3. The inclination angle θ by which the virtual sound sources are tilted correlates with the expected (anticipated) tilting angle of the vehicle body caused by the braking state, as indicated in FIG. 4*c* below. A more detailed explanation of an example for determining the inclination angle θ is provided below in FIG. 5.

FIG. 4c shows the vehicle 1 in a braking state. The vehicle's suspension system reacts to the braking force applied by the car's braking unit and the vehicle body tilts with respect to the ground by a tilting angle θ. It should be noted that in the embodiment of FIG. 4c the audio rendering does not change the position of the virtual sound sources during the braking state any further. That is, in the reference frame defined by the ground G (environment of the car), in the braking state the entire sound field is shifted together with the vehicle 1 according to the tilting of the vehicle body. However, the positions of the virtual sound sources V1' and V3' with respect to the reference frame of the vehicle interior (e.g. speakers SP1 to SP10 in FIG. 2) are identical to those in FIG. 4b.

Alternatively, in the braking state (or after the braking state), the 3D audio rendering may relax the positions of the virtual sound sources to the original positions V1 and V3 within the vehicle. Therefore, when the braking maneuver executes or ends, the virtual sound sources may again be located at their original positions V1, V3 within the vehicle 1.

Figure 5:
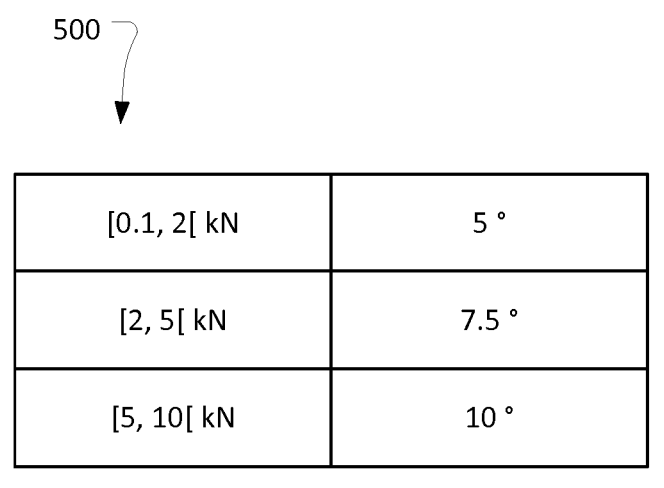

FIG. 5 schematically depicts, as an example, a table 500 where a relation between an inclination angle θ and a braking force is predefined. An autonomous driving section (see 110 of FIG. 1) indicates to a 3D audio rendering section (see 120 of FIG. 1) information about a planned maneuver. Here the planned maneuver is a braking maneuver and the information about the planned maneuver comprises a braking force that is intended to be applied during the braking maneuver. When the braking force is equal to or bigger than 0.1 kN and smaller than 2 kN the inclination angle θ is set to 5 degree. When the braking force is equal to or bigger than 2 kN and smaller than 5 kN the inclination angle θ is set to 7.5 degree. When the braking force is equal to or bigger than 5 kN and smaller than 10 kN the inclination angle θ is set to 10 degree. The inclination angles θ in table 500 to some extent reflect the current tilting of a vehicle body as resulting from a respective braking force and may be predefined parameters stored in the 3D audio rendering section. That is, the higher the braking force is, the stronger is tilting of the sound field is. The parameters may have been obtained by simulation or by experiments in advance.

In the embodiment of FIG. 5, the inclination angle θ depends on only one parameter, namely the braking force. In alternative embodiments, multiple parameters may be used to determine the inclination angle θ of the sound field, e.g. an intended braking force, an intended vehicle velocity, etc.

Figure 6A:
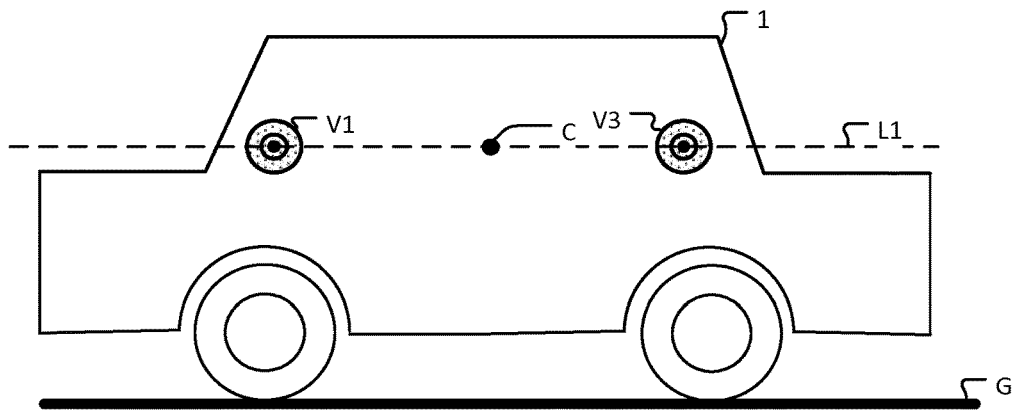
FIG. 6a, b, c schematically depict a process where the positions of virtual sound sources are tilted and shifted forward based on the information about a planned maneuver.

In the embodiment of FIGS. 4a, b, c and 5, the positions of the virtual sound sources have been tilted by an inclination angle θ. FIG. 6a, b, c schematically depict, as an alternative embodiment, where not only the virtual sound sources are tilted based on the planned maneuver but also shifted forward. According to this embodiment, a 3D audio rendering section (see 120 of FIG. 1) obtains from an autonomous driving section (see 110 of FIG. 1) information that indicates that the vehicle is intended to brake.

FIG. 6a shows a vehicle 1 is in normal driving state where the vehicle is driving on a road with substantially constant velocity. As in FIG. 4a the virtual sound sources V1 and V3 are arranged at a first alignment line L1 that is parallel to the ground G (horizontal), and a center point C in FIG. 6a indicates the center between the virtual sound sources V1 and V3.

Figure 6B:
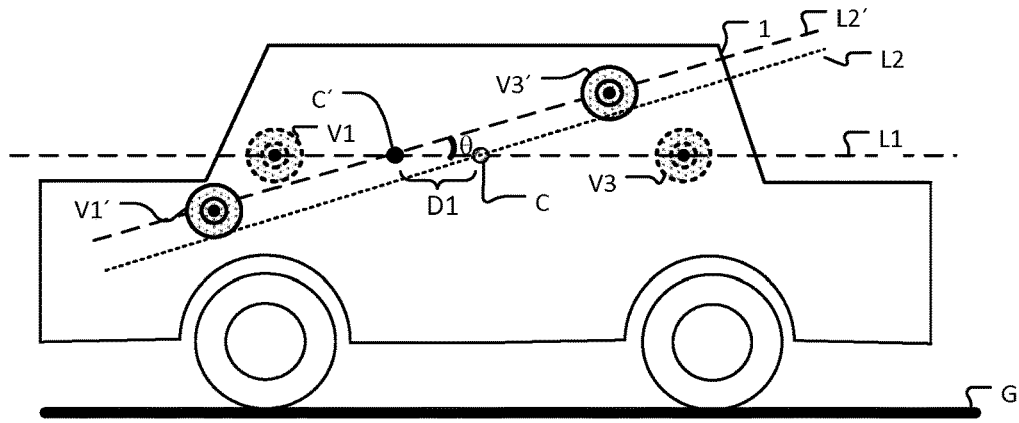

FIG. 6b shows the situation where the 3D audio rendering section obtains the information about a planned maneuver, here that the vehicle intends to brake. Based on the information about the planned maneuver, an inclination angle θ is determined, as in FIG. 4b, and the first alignment line L1 is tilted to a second alignment line L2. Additionally in this embodiment, a shifting distance D1 is determined based on the information about the planned maneuver. The shifting distance D1 is the distance by which a center point C of the virtual sound sources V1 and V2 is shifted forward, and consequently the center of the second alignment line L2 is shifted horizontally based on the determined shifting distance D1. An example of determining the shifting distance D1 is provided below in FIG. 7.

Figure 6C:
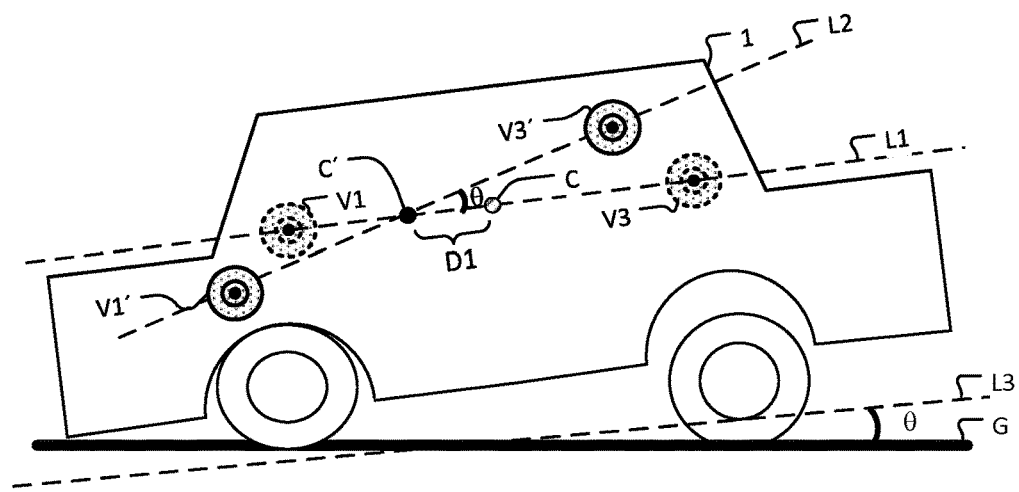

FIG. 6c shows the vehicle 1 in a braking state. As in FIG. 4c, the audio rendering does not change the position of the virtual sound sources during the braking state any further.

Figure 7:
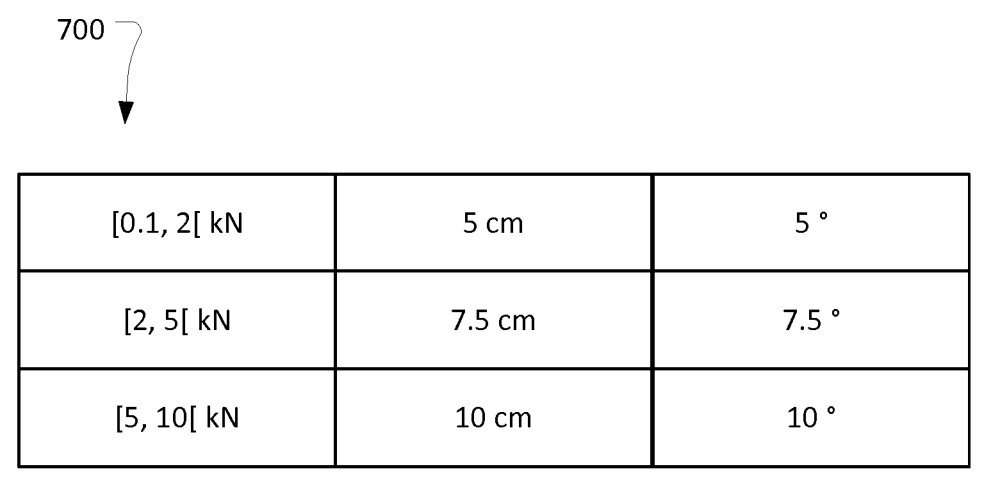

FIG. 7 schematically depicts, as an example, a table 700 that defines a relation between a shifting distance D1 and an inclination angle θ of a sound field and braking force. According to this embodiment, an autonomous driving section (see 110 of FIG. 1) indicates to a 3D audio rendering section (see 120 of FIG. 1) information about a planned maneuver. Here the planned maneuver is a braking maneuver and the information about the planned maneuver comprises a braking force that is intended to be applied during the braking maneuver. When the braking force is equal to or bigger than 0.1 kN and smaller than 2 kN the shifting distance D1 of the sound filed is set to 5 cm and the inclination angle θ of the sound filed is set to 5 degree. When the braking force is equal to or bigger than 2 kN and smaller than 5 kN the shifting distance (D1) is set to 7.5 cm and the inclination angle (θ) is set to 7.5 degree. When the braking force is equal to or bigger than 5 kN and smaller than 10 kN the shifting distance D1 is set to 10 cm and the inclination angle θ is set to 10 degree. The shifting distance D1 included in table 700 are chosen in such a way that they reflect the current tilting of a vehicle body as resulting from a respective braking force and may be predefined parameters stored in the 3D audio rendering section. The parameters may have been obtained by simulation or by experiments in advance. In FIG. 7 the relationship between braking force and shifting distance is defined stepwise. However, it is also possible to use interpolation or mathematical models to define the relationship between braking force and shifting distance.

FIGS. 4 and 6 are based on the example in which the vehicle is in a braking maneuver, a similar approach may be applied to vehicles in various other maneuvers such as acceleration, deceleration, cornering and so on. For example, in the case where the vehicle is in an acceleration maneuver, the virtual sound sources may be shifted backward. Also, a sound field may anticipate a planned cornering maneuver, i.e. the virtual sound sources may be shifted or rotated in the desired curving direction to inform the driver in advance and prepare him for the cornering direction. Furthermore, it is also possible to combine two or more maneuvers, for example, a vehicle that turns and slows down.

Further, FIGS. 4 and 6 shows only two virtual sound sources V1 and V2, however, the number of virtual sound sources are not restricted, and a similar approach may be applied to other sound sources.

Placing Virtual Sound Sources According to a Visual Scenery Depth

Figure 8:
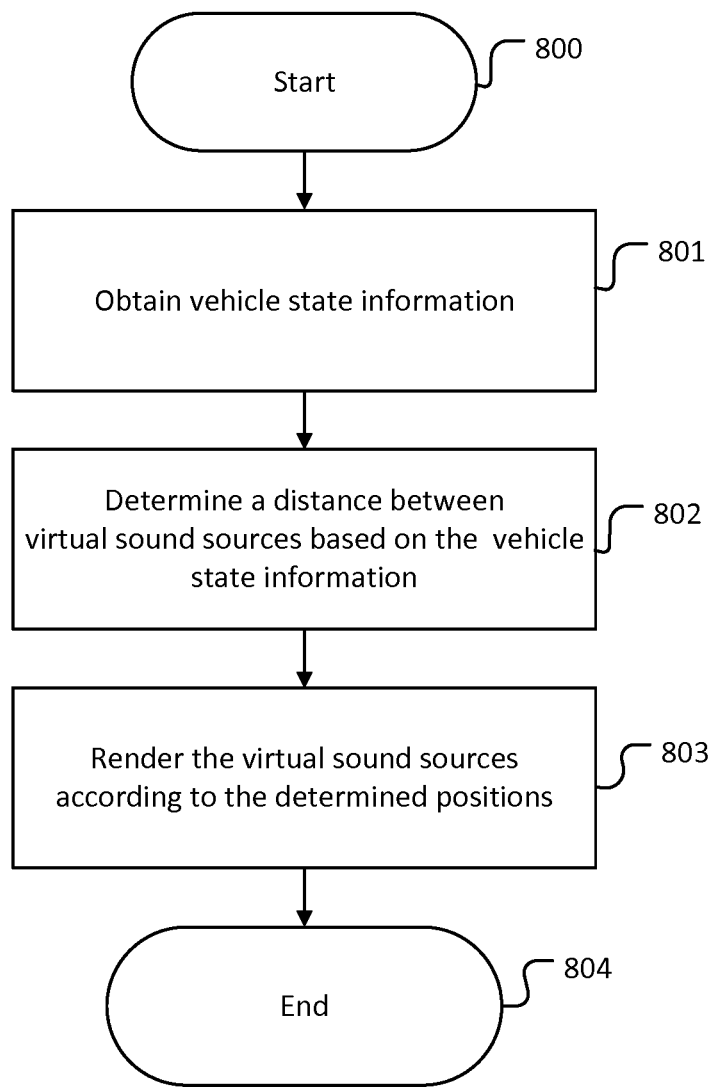
FIG. 8 schematically depicts a process that synchronizes a distance between virtual sound sources with a vehicle state.

FIG. 8 schematically depicts as another embodiment, a process that synchronizes the wideness of a sound field, e.g. determined by the virtual sound sources (V1 to V4 of FIG. 2), with a vehicle state. At 800, the process starts. At 801, the process obtains current vehicle state information from the vehicle state detection section (see 140 of FIG. 1, e.g. 7110 of FIG. 17). The vehicle state information may for example comprise a speed of the vehicle. At 802, the process determines a distance D2 between virtual sound sources based on the vehicle state information. For example, when the vehicle is in high speed the distance between virtual sound sources may be set small. At 803, the process renders the virtual sound sources according to the positions as determined in 802. At 804, the process ends.

Figure 9:
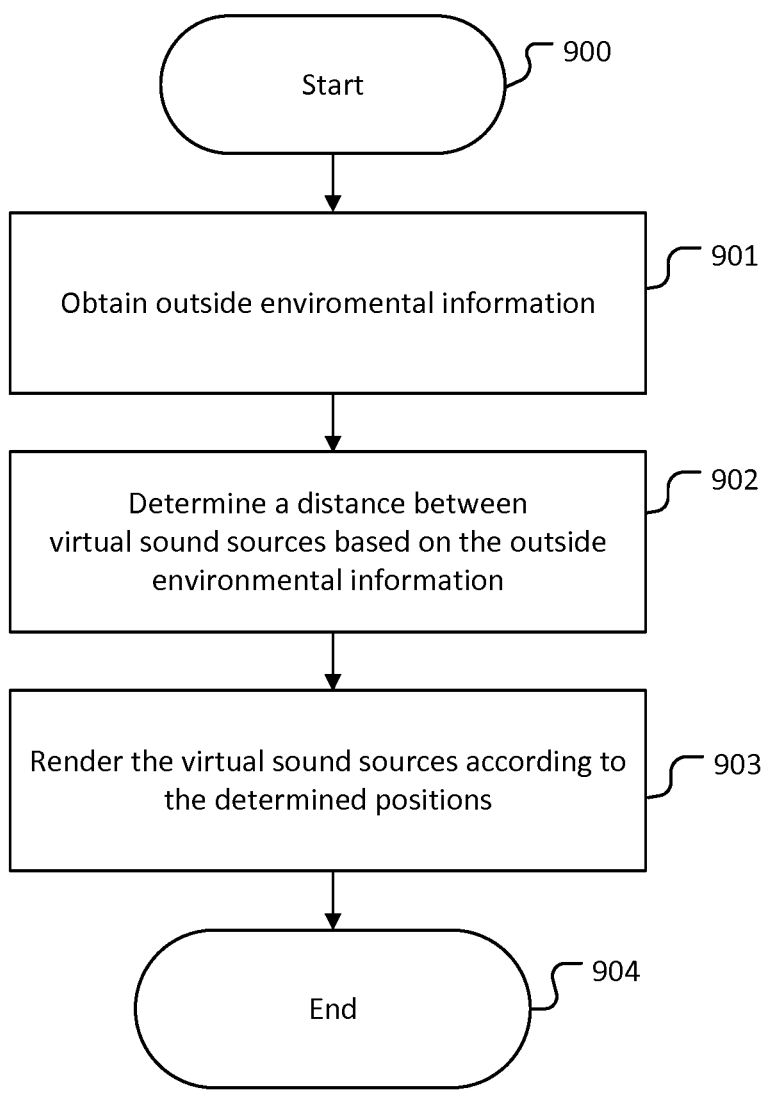
FIG. 9 schematically depicts a process that synchronizes a distance between virtual sound sources with outside information.

FIG. 9 schematically depicts as an alternative embodiment, a process that synchronizes the wideness of a sound field, e.g. determined by the distance between virtual sound sources (V1 to V4 of FIG. 2) with outside environmental information. At 900, the process starts. At 901, the process obtains current outside environmental information form the environment information section (see 150 of FIG. 1, e.g. 7400 of FIG. 17). The outside environmental information may for example, a daily light intensity or whether condition. At 902, the process determines a distance D2 between virtual sound sources based on the outside environmental information. For example, when the outside environmental information indicate a night drive or that it is raining outside, the distance between the virtual sound sources may be set small. At 903, the process renders the virtual sound sources according to the positions as determined in 902. At 904, the process ends.

Figure 10A:
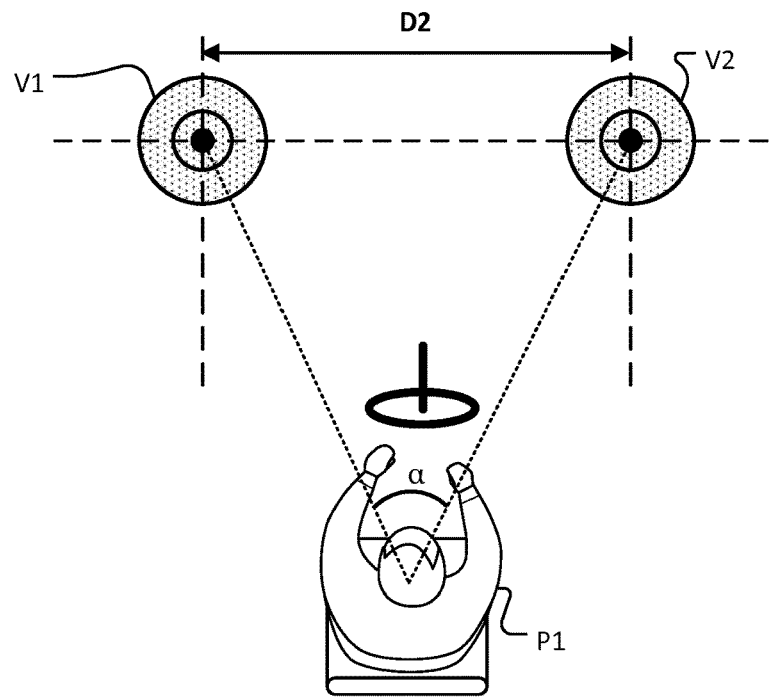
FIGS. 10a, b schematically depict a process of synchronizing a distance between virtual sound sources with parameters influencing a visual scenery depth of a driver.

FIGS. 10a, b schematically depict an example of a process of synchronizing the wideness of a sound field, determined e.g. by the distance between virtual sound sources, with vehicle state information or outside environmental information that may reflect an impact on a visual scenery depth of a driver. FIG. 10a, b schematically depicts a plan view of the vehicle 1 in FIG. 2, wherein a distance D2 of virtual sound sources V1, V2 is synchronized with vehicle state information or outside environmental information, which is based on the information based on vehicle state and/or outside information.

Figure 10B:
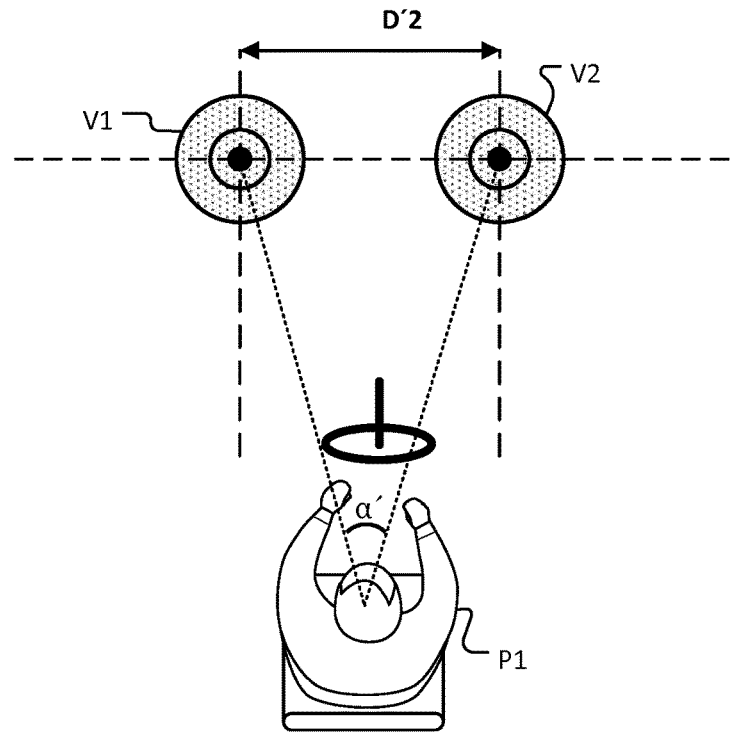

FIG. 10a shows a state where the vehicle is driving at a low speed. Typically, at low speeds, the visual scenery depth of a person is large. Accordingly, at low speeds, the distance D2 between the virtual sound sources V1 and V2, respectively the angle α defined by the position of the virtual sound sources V1 and V2 with respect to the driver P1 is set to be large. On the other hand, FIG. 10b shows a state where the vehicle is driving at a high speed. Typically, at high speeds, the visual scenery depth of a person is small. Accordingly, at high speeds, the distance D2 between the virtual sound sources V1 and V2, respectively the angle α defined by the position of the virtual sound sources V1 and V2 with respect to the driver P1 is set to be small so that the wideness of the sound field generated by the virtual sound sources V1 and V2 reflects the visual scenery depth of a passenger inside the vehicle.

FIG. 11 schematically depicts, as an example, a table 1100 where a relation between a distance D2 between virtual sound sources and a velocity of a vehicle is predefined. According this embodiment, a vehicle state detection section (see 140 of FIG. 1, and 7110 of FIG. 17) indicates to an 3D audio rendering section information about a vehicle state. Here the vehicle state is the velocity of the vehicle. When the velocity is equal to or faster than 0 km/h and smaller than 50 km/h the distance D2 between virtual sound sources is set to 5 m. When the velocity is equal to or faster than 50 km/h and smaller than 100 km/h the distance D2 between virtual sound sources is set to 2 m. When the velocity is equal to or faster than 100 km/h and smaller than 250 km/h the distance D2 between virtual sound sources is set to 1 m. The distance D2 included in table 1100 are chosen in such a way that they reflect the current visual scenery depth of passenger as resulting from a respective vehicle state and may be predefined parameters stored in the 3D audio rendering section. The parameters may have been obtained by simulation or by experiments in advance. In FIG. 11 the relationship between velocity and the distance between virtual sound sources is defined stepwise. However, it is also possible to use interpolation or mathematical models to define the relationship between velocity and the distance between virtual sound sources.

FIG. 12 schematically depicts, as an example, a table 1200 where a relation between a distance D2 between virtual sound sources and outside environmental information is predefined. According this embodiment, an environment information section (see 150 of FIG. 1, e.g. 7400 of FIG. 17) indicates to a 3D audio rendering section information about the environment of the vehicle. Here the environment information comprises information indicating a weather condition. When the weather is sunny the distance D2 between virtual sound sources is set to 5 m. When the weather is cloudy the distance D2 between virtual sound sources is set to 2 m. When the weather is rainy the distance D2 between virtual sound sources is set to 1 m. The distance D2 included in table 1200 should reflect the current visual scenery depth of passenger as resulting from a respective outside environmental information and may be predefined parameters stored in the 3D audio rendering section. The parameters may have been obtained by simulation or by experiments in advance. In FIG. 12 the relationship between weather condition and the distance between virtual sound sources is defined stepwise. However, it is also possible to use interpolation or mathematical models to define the relationship between weather condition and the distance between virtual sound sources.

Placing a Virtual Sound Source According to the Urgency of a Notification

Figure 13:
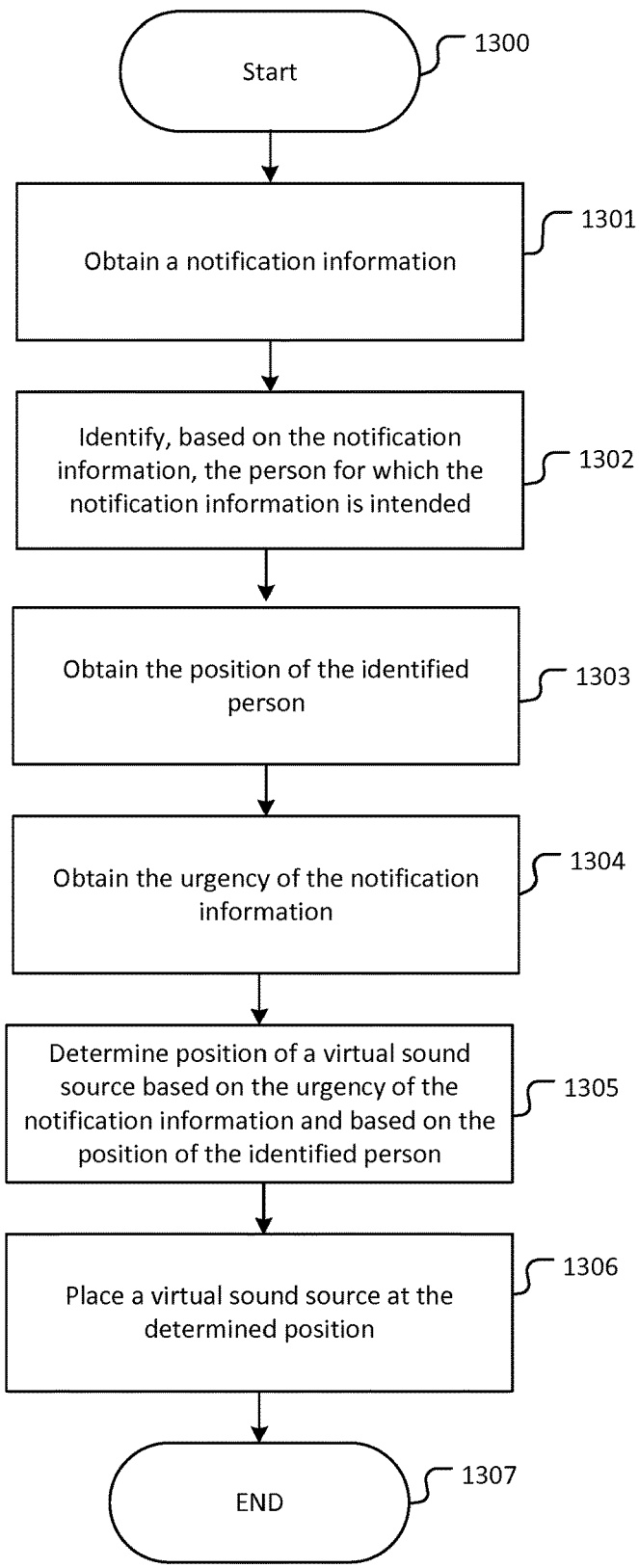
FIG. 13 schematically depicts a process that places virtual sound sources based on the urgency of a notification.

FIG. 13 schematically depicts an embodiment of a process that places virtual sound sources based on the urgency of a notification. At 1300, the process starts. At 1301, the process obtains a notification. At 1302, the process identifies to whom in the vehicle the notification is addressed. At 1303, the process obtains the position of the identified person. At 1304, the process obtains the urgency of the notification information. At 1305, the process obtains a position of a virtual sound source based on the urgency of the notification information and based on the position of the identified person. At 1306, the process places a virtual sound source at the determined position. At 1307, the process ends.

The notification may be obtained from an external device. For example, an external server, such as a traffic control server, may generate notifications about important traffic situations, such as an accident, emergency, police, etc. Alternatively, an external telecommunication service may generate a phone call to a passenger inside the vehicle. A vehicle control system (see 7000 of FIG. 17) within the vehicle may also generate a notification. For example, a notification may be generated from the outside-vehicle information detecting unit (see 7400 of FIG. 17). Outside-vehicle information detecting unit (see 7400 of FIG. 17) may detect a distance between other vehicles, and if the distance is too close, the outside-vehicle information detecting unit may generate a notification to the driver. In addition, the in-vehicle information detecting unit (see 7500 of FIG. 17) may also generate a notification. For example, when the driver state detecting section (see 7510 of FIG. 17) of the in-vehicle information detecting unit detects that the driver is fatigue, the vehicle information detecting unit may generate a notification to the driver.

The urgency of the notification information may be determined through various parameters. For example, a predefined time parameter may be used to determine the urgency of the notification information. Alternatively, a predefined distance parameter such as a predefined distance between other vehicles or a predefined distance between danger areas can be used for the decision.

In order to obtain the position of the identified person for which a notification is intended, various sensor may be used. The sensors may be any type of sensors, such as a pressure sensor, a temperature sensor, and/or a video camera. Pressure sensor may be located on the passenger seats and may be capable to obtain a respective presence of the passengers. In the case, one or more video cameras are used to obtain the position of the identified person, it is further possible to obtain a head position and orientation of the identified person. Video cameras may obtain an image from the identified person, and by aid of a face recognition algorithms the head position and orientation of the identified person is obtained. Based on this information the electronic device tracks the position and orientation of the head of intended person. Techniques for face recognition and determining the position and the orientation of a head are known to the skilled person. Such techniques may be based on recognition of features of a face such as mouth, nose, eyes and/or ears. Video cameras may be distributed over a predefined space, or a single camera can be used to obtain an image.

Figure 14A:
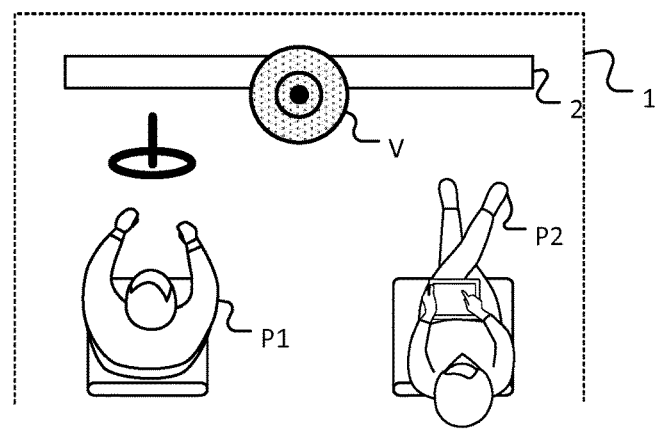
FIG. 14a, b, c schematically depict a process of placing virtual sound sources based on an urgency of a notification.

FIG. 14a, b schematically depicts an example of a process of placing virtual sound sources based on an urgency of a notification. According to this embodiment, a 3D audio rendering section (see 120 of FIG. 1) obtains from an environment information section (see 150 of FIG. 1; e.g. 7750 in FIG. 16) a phone call for a driver.

In FIG. 14a, the virtual sound source V renders an audio signal related to a notification, such as the ring tone related to a phone call, which is intended for a driver P1 but not for a co-driver P2. When the call comes in, the virtual sound source V is placed at the dashboard 2 of the vehicle 1.

Figure 14B:
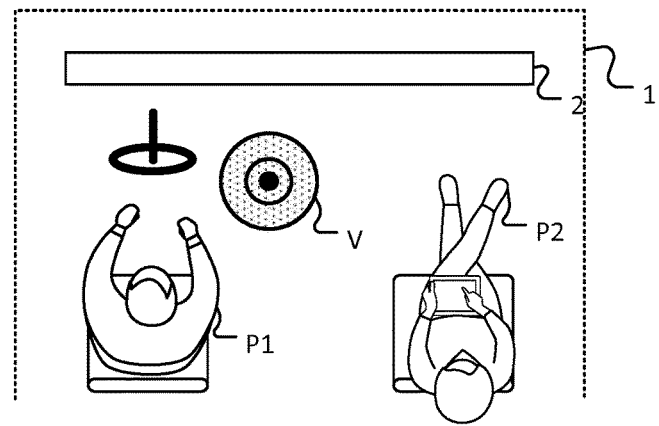

FIG. 14b shows a state when the driver P1 does not respond to the first notification after a predefined time. In that case, the virtual sound source V is located closer to the driver P1. Therefore, the driver P1 may notice that the incoming call is addressed to him but not to the co-driver P2 and the driver P1 may notice that the urgency of answering the call has increased.

Figure 14C:
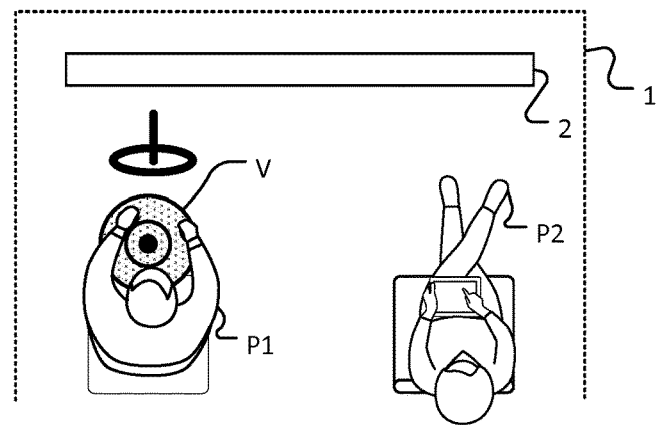

FIG. 14c shows a state when the driver P1 still does not react to the phone call. In that case, the virtual sound source V is located directly at the position of the driver P1, e.g. at the head position of the driver P1. Thus the driver P1 may notice that the urgency of answering the call has still increased.

The notification information may relate to any kind of notification that alerts one or more passenger in vehicle 1, for example information related to an incoming phone call, information related to an outside accident, information related to an emergency case, information related to a police incident, etc. In the case, where virtual sound sources are used as a warning notification, the virtual sound sources may be placed closer based on the distance to the point of interest, e.g. a place of danger. For example when an accident happens far away, the virtual sound source V may be located in far distance as indicated in FIG. 14a, and when the danger becomes imminent the virtual sound source V may be located closer, as indicated in FIG. 14b. If the danger is very close, respectively the virtual sound source V may be located directly at the driver P1, as shown in FIG. 14c. Therefore, important traffic situations are acoustically highlighted by the audio system.

System for Digitalized Monopole Synthesis in the Case of Integer Delays

Figure 15:
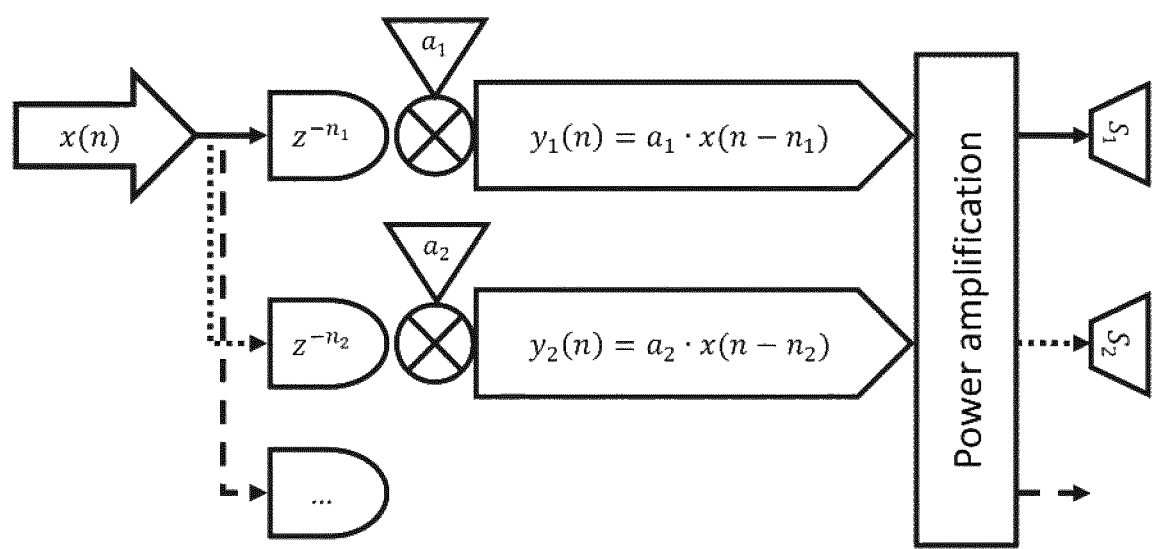
FIG. 15 schematically depicts a diagram of a system applying digitalized monopole synthesis algorithm to produce virtual sound sources.

FIG. 15 provides an embodiment of a 3D audio rendering that is based on a digitalized Monopole Synthesis algorithm. The theoretical background of this technique is described in more detail in patent application US 2016/0037282 A1 that is herewith incorporated by reference.

The technique, which is implemented in the embodiments of US 2016/0037282 A1, is conceptually similar to the Wavefield synthesis, which uses a restricted number of acoustic enclosures to generate a defined sound field. The fundamental basis of the generation principle of the embodiments is, however, specific, since the synthesis does not try to model the sound field exactly but is based on a least square approach.

A target sound field is modelled as at least one target monopole placed at a defined target position. In one embodiment, the target sound field is modelled as one single target monopole. In other embodiments, the target sound field is modelled as multiple target monopoles placed at respective defined target positions. For example, each target monopole may represent a noise cancelation source comprised in a set of multiple noise cancelation sources positioned at a specific location within a space. The position of a target monopole may be moving. For example, a target monopole may adapt to the movement of a noise source to be attenuated. If multiple target monopoles are used to represent a target sound field, then the methods of synthesizing the sound of a target monopole based on a set of defined synthesis monopoles as described below may be applied for each target monopole independently, and the contributions of the synthesis monopoles obtained for each target monopole may be summed to reconstruct the target sound field.

A source signal x(n) is fed to delay units labelled by $z^{-n_p}$ and to amplification units $a_p$, where p=1, ..., N is the index of the respective synthesis monopole used for synthesizing the target monopole signal. The delay and amplification units according to this embodiment may apply equation (117) of reference US 2016/0037282 A1 to compute the resulting signals $y_p(n)=s_p(n)$ which are used to synthesize the target monopole signal. The resulting signals $s_p(n)$ are power amplified and fed to loudspeaker $S_p$.

In this embodiment, the synthesis is thus performed in the form of delayed and amplified components of the source signal x.

According to this embodiment, the delay $n_p$ for a synthesis monopole indexed p is corresponding to the propagation time of sound for the Euclidean distance $r=R_{p0}=|r_p-r_o|$ between the target monopole $r_o$ and the generator $r_p$.

Further, according to this embodiment, the amplification factor $$a_p = \frac{\rho c}{R_{p0}}$$

is inversely proportional to the distance $r=R_{p0}$.

In alternative embodiments of the system, the modified amplification factor according to equation (118) of reference US 2016/0037282 A1 can be used.

Implementation

The technology according to the embodiments of the present disclosure is applicable to various products. For example, the technology according to an embodiment of the present disclosure may be implemented as a device included in a mobile body that is any of kinds of automobiles, electric vehicles, hybrid electric vehicles, motorcycles, bicycles, personal mobility vehicles, airplanes, drones, ships, robots, construction machinery, agricultural machinery (tractors), and the like. Further, the technology according to the embodiments of the present disclosure may be applicable for self-driving cars.

Figure 16:
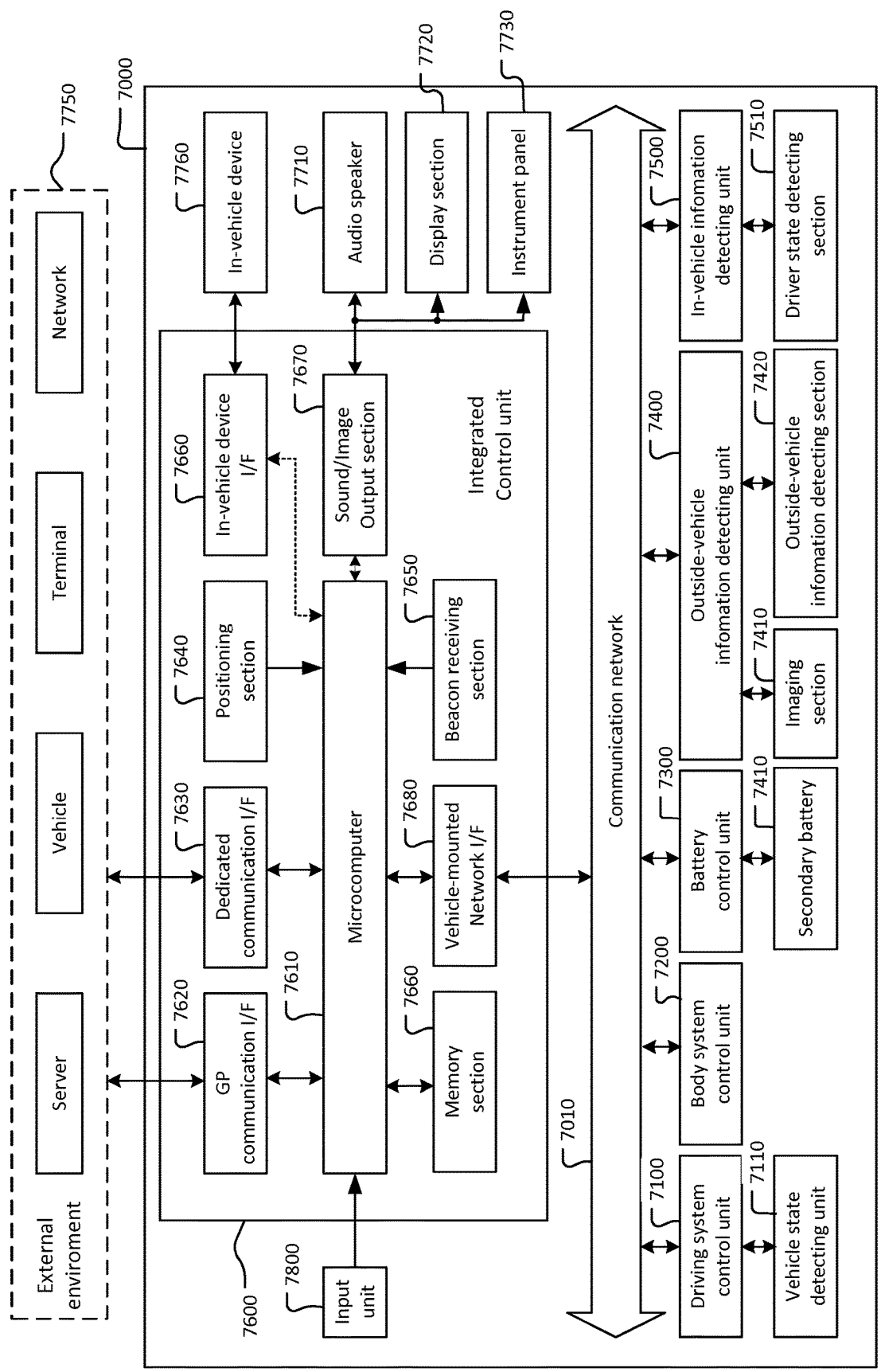
FIG. 16 schematically depicts a block diagram of a vehicle control system.

FIG. 16 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 16, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 16 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 17:
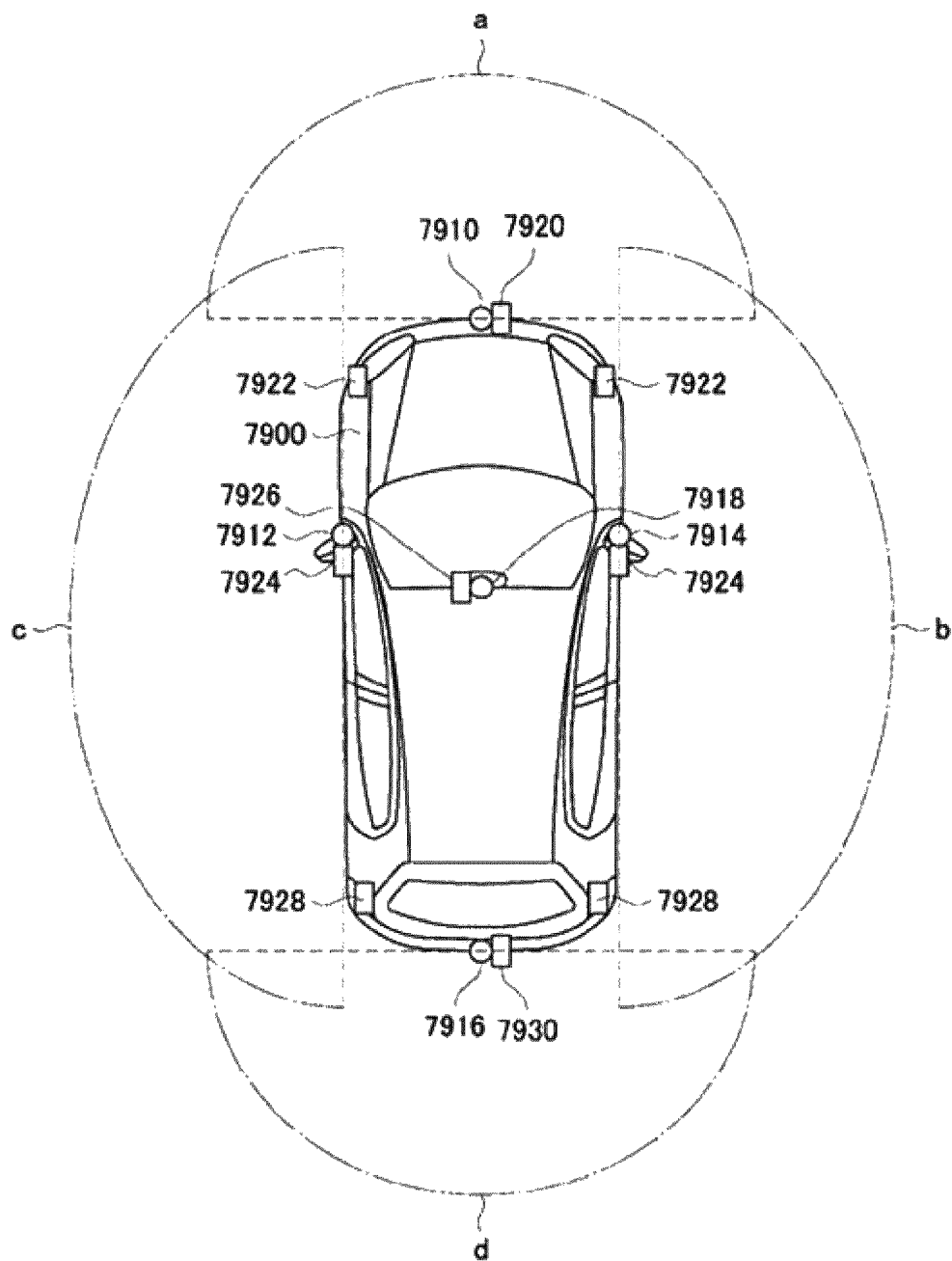
FIG. 17 schematically depicts an outside-vehicle information detecting section and an imaging section of a vehicle.

FIG. 17 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 17 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door.

A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 16, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 16, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 16 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

Incidentally, a computer program for realizing the functions of the electronic device 100 according to the present embodiment described with reference to FIG. 1 can be implemented in one of the control units or the like. In addition, a computer readable recording medium storing such a computer program can also be provided. The recording medium is, for example, a magnetic disk, an optical disk, a magneto-optical disk, a flash memory, or the like. In addition, the above-described computer program may be distributed via a network, for example, without the recording medium being used.

In the vehicle control system 7000 described above, the electronic device 100 and 110 according to the present embodiment described with reference to FIG. 1 can be applied to the integrated control unit 7600 in the application example depicted in FIG. 17.

In addition, at least part of the constituent elements of the information processing device 100 described with reference to FIG. 1 may be implemented in a module (for example, an integrated circuit module formed with a single die) for the integrated control unit 7600 depicted in FIG. 17. Alternatively, the electronic device 100 described with reference to FIG. 1 may be implemented by a plurality of control units of the vehicle control system 7000 depicted in FIG. 17.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

It should be recognized that the embodiments describe methods with an exemplary ordering of method steps. The specific ordering of method steps is however given for illustrative purposes only and should not be construed as binding. For example the ordering in the embodiment of FIGS. 3, 8, 9 and 13 may be exchanged.

It should be noted that the division of sections in FIGS. 1 and 16 is only made for illustration purposes and that the present disclosure is not limited to any specific division of functions in specific units. For instance, the 3D Audio rendering section (see 120 of FIG. 1) could be implemented by a respective programmed processor, field programmable gate array (FPGA) and the like.

The method can also be implemented as a computer program causing a computer and/or a processor, such as processor (see 7610 of FIG. 16) discussed above, to perform the method, when being carried out on the computer and/or processor. In some embodiments, also a non-transitory computer-readable recording medium is provided that stores therein a computer program product, which, when executed by a processor, such as the processor described above, causes the method described to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

[1] An electronic device for a vehicle (1) comprising
circuitry configured to obtain information about a planned maneuver of the vehicle (1); and
circuitry configured to determine the position and/or orientation of a sound field based on the information about the planned maneuver of the vehicle (1).

[2] The electronic device of [1], wherein the circuitry is configured to determine the position and/or orientation of the sound field by moving one or more virtual sound sources (V1,V2,V3,V4) based on information about the planned maneuver of a vehicle (1).

[3] The electronic device of [1] or [2], wherein the circuitry is configured to anticipate the planned maneuver by moving the sound field in accordance with the planned maneuver.

[4] The electronic device of anyone of [1] to [3], wherein the information about the planned maneuver of the vehicle (1) comprises a braking force, a steering angle, a velocity and/or accelerating parameter.

[5] The electronic device of anyone of [1] to [4], wherein the circuitry is configured to anticipate the planned maneuver by tilting the sound field based on an inclination angle (θ) in accordance with the planned maneuver.

[6] The electronic device of anyone of [1] to [5], wherein the circuitry is configured to anticipate the planned maneuver by moving the sound field horizontally in accordance with the planned maneuver.

[7] The electronic device of anyone of [1] to [6], wherein the circuitry is configured to obtain the information about the planned maneuver from an autonomous driving section (100).

[8] The electronic device of [2], wherein the circuitry is configured to render the sound field according to the determined positions the virtual sound sources (V1,V2,V3,V4).

[9] The electronic device of anyone of [1] to [8], wherein the circuitry is configured to produce the sound field by 3D Audio rendering techniques.

[10] The electronic device of [9], wherein the 3D audio rendering operation is based on Wavefield synthesis.

[11] The electronic device of [9], wherein the 3D audio rendering operation is based on monopole synthesis.

[12] A method to determine the position and/or orientation of a sound field based on information about a planned maneuver of a vehicle (1).

[13] A computer program to determine the position and/or orientation of a sound field based on information about a planned maneuver of a vehicle (1).

[14] An electronic device for a vehicle (1) comprising
circuitry configured to obtain information about outside environmental information and/or vehicle state information of the vehicle (1); and
circuitry configured to determine the audio wideness of a sound field produced by virtual sound sources (V1, V2) based on the outside environmental information and/or the vehicle state information of a vehicle (1).

[15] The electronic device of [14], wherein the outside environmental information and/or vehicle state information correlate with a visual scenery depth of a passenger (P1) inside the vehicle (1).

[16] The electronic device of [14] or [15] wherein the circuitry is configured to, in order to determine the audio wideness of the sound field, determine a distance (D2) between virtual sound sources (V1, V2).

[17] The electronic device of anyone of [14] to [16], wherein the vehicle state information comprises information reflecting a speed of the vehicle (1).

[18] The electronic device of anyone of [14] to [17], wherein the vehicle state information comprises information reflecting a braking force, a steering angle of a steering wheel, and/or an accelerating parameter.

[19] The electronic device of anyone of [14] to [18], wherein the outside environmental information comprises information reflecting an outside light intensity.

[20] The electronic device of anyone of [14] to [19], wherein the circuitry is configured to communicate with a vehicle state detecting section (140) in order to obtain the vehicle state information.

[21] The electronic device of anyone of [14] to [20], wherein the circuitry is configured to communicate with an environment information section (150) in order to obtain the outside environment information.

[22] The electronic device of anyone of [14] to [21], wherein the circuitry is configured to produce the sound field by 3D Audio rendering techniques.

[23] The electronic device of [22], wherein the 3D audio rendering operation is based on Wavefield synthesis.

[24] The electronic device of [22], wherein the 3D audio rendering operation is based on monopole synthesis.

[25] A method to determine an audio wideness of a sound field produced by virtual sound sources (V1, V2) based on outside environmental information and/or vehicle state information of a vehicle (1).

[26] A computer program to determine an audio wideness of a sound field produced by virtual sound sources (V1, V2) based on outside environmental information and/or vehicle state information of a vehicle (1).

[27] An electronic device for a vehicle (1) comprising
circuitry configured to obtain information about an urgency of notification information and information about a position of a passenger inside the vehicle (1); and
circuitry configured to determine the position and/or orientation of a sound field based on the urgency of the notification information and the information about the position of the passenger (P1) inside the vehicle (1).

[28] The electronic device of [27], wherein the circuitry is configured to determine the position and/or orientation of the sound field by moving one or more virtual sound sources (V) based on an urgency of notification information and information about a position of a passenger (P1) inside a vehicle (1).

[29] The electronic device of [27] or [28], wherein the circuitry is configured to obtain the urgency of the notification information.

[30] The electronic device of anyone of [27] to [29], wherein the urgency of a notification information relates to a phone call and the urgency of the notification information depends on the time period the phone call is unanswered.

[31] The electronic device of anyone of [27] to [30], wherein the urgency of a notification information is based on a distance between a point of interest and the vehicle (1).

[32] The electronic device of anyone of [27] to [31], wherein the circuitry is configured to identify, based on the notification information, the passenger (P1) for which the notification information is intended, and to obtain the position of the identified passenger (P1).

[33] The electronic device of anyone of [27] to [32], wherein the circuitry is configured to provide the sound field for the passenger based on the position of the passenger (P1) and/or based on the position and orientation of the head of the passenger (P1).

[34] The electronic device of anyone of [27] to [33], wherein the circuitry is configured to obtain the notification information from an environment information section (150).

[35] The electronic device of [28], wherein the circuitry is configured to render the sound field according to the determined position of the virtual sound sources (V).

[36] The electronic device of anyone of [27] to [36], wherein the circuitry is configured to produce the sound field by 3D Audio rendering techniques.

[37] The electronic device of [36], wherein the 3D audio rendering operation is based on Wavefield synthesis.

[38] The electronic device of [36], wherein the 3D audio rendering operation is based on monopole synthesis.

[39] A method to determine the position and/or orientation of a sound field based on an urgency of notification information and information about a position of a passenger (P1) inside a vehicle (1).

[40] A computer program to determine the position and/or orientation of a sound field based on an urgency of notification information and information about a position of a passenger (P1) inside a vehicle (1).

[41] A computer readable medium comprising instructions, the instructions when executed on a processor causing the processor to determine an audio wideness of a sound field produced by virtual sound sources (V1, V2) based on outside environmental information and/or vehicle state information of a vehicle (1).

[42] A computer readable medium comprising instructions, the instructions when executed on a processor causing the processor to determine an audio wideness of a sound field produced by virtual sound sources (V1, V2) based on outside environmental information and/or vehicle state information of a vehicle (1).

[43] A computer readable medium comprising instructions, the instructions when executed on a processor causing the processor to determine the position and/or orientation of a sound field based on an urgency of notification information and information about a position of a passenger (P1) inside a vehicle (1).

The invention claimed is:

1. An electronic device for a vehicle comprising:
   circuitry configured to
      obtain information about a planned maneuver of the vehicle,
      determine a future position and/or a future orientation of a sound field based on the information about the planned maneuver of the vehicle, and
      render the sound field at the future position and/or the future orientation prior to or upon initiating the planned maneuver of the vehicle,
   wherein the circuitry is configured to obtain the information about the planned maneuver from an autonomous driving section, the autonomous driving section controlling semi- or full-autonomous driving operations of the vehicle during the obtaining the information about the planned maneuver of the vehicle.

2. The electronic device of claim 1, wherein the circuitry is configured to render the future position and/or the future orientation of the sound field by moving one or more virtual sound sources based on the information about the planned maneuver of the vehicle.

3. The electronic device of claim 2,
   wherein the one or more virtual sound sources include multiple virtual sound sources, and
   wherein the circuitry is configured to render the sound field according to the determined positions the virtual sound sources.

4. The electronic device of claim 1, wherein the circuitry is configured to anticipate the planned maneuver by moving the sound field in accordance with the planned maneuver.

5. The electronic device of claim 1, wherein the information about the planned maneuver of the vehicle comprises a braking force, a steering angle, a velocity and/or accelerating parameter.

6. The electronic device of claim 1, wherein the circuitry is configured to anticipate the planned maneuver by tilting the sound field based on an inclination angle in accordance with the planned maneuver.

7. The electronic device of claim 1, wherein the circuitry is configured to anticipate the planned maneuver by moving the sound field horizontally in accordance with the planned maneuver.

8. The electronic device of claim 1, wherein the circuitry is configured to render the sound field by 3D Audio rendering techniques.

9. The electronic device of claim 8, wherein the 3D audio rendering operation is based on Wavefield synthesis.

10. The electronic device of claim 8, wherein the 3D audio rendering operation is based on monopole synthesis.

11. The electronic device of claim 1, wherein the circuitry is configured to match audio wideness of the sound field with parameters that reflect visual scenery depth of one or more passengers of the vehicle.

12. The electronic device of claim 1, wherein the circuitry is configured to
    determine an urgency associated with the planned maneuver of the vehicle,
    determine the future position and/or the future orientation of the sound field based on the urgency and information about a passenger of the vehicle.

13. The electronic device of claim 1, wherein the circuitry is configured to
    determine the position and the future orientation of a sound field based on the information about the planned maneuver of the vehicle, and
    render the sound field at the future position and the future orientation prior to or upon initiating the planned maneuver of the vehicle.

14. A method comprising:
    obtaining, using a processor, information about a planned maneuver of a vehicle;
    determining, using the processor, a future position and/or a future orientation of a sound field based on information about a planned maneuver of the vehicle; and
    rendering, using the processor, the sound field at the future position and/or the future orientation prior to or upon initiating the planned maneuver of the vehicle,
    wherein said obtaining the information about the planned maneuver is performed while the vehicle is being controlled in an autonomous or semi-autonomous driving mode.

15. A non-transitory computer-readable storage medium having stored thereon instructions that, when executed by one or more processors, causes the one or more processors to perform a method comprising:
    obtaining information about a planned maneuver of a vehicle;
    determining a future position and/or a future orientation of a sound field based on information about a planned maneuver of the vehicle; and
    rendering the sound field at the future position and/or the future orientation prior to or during performance of the planned maneuver of the vehicle,
    wherein said obtaining the information about the planned maneuver is performed while the vehicle is being controlled in an autonomous or semi-autonomous driving mode.

* * * * *